(12) United States Patent
Alston

(10) Patent No.: US 11,107,448 B2
(45) Date of Patent: Aug. 31, 2021

(54) COMPUTING TECHNOLOGIES FOR MUSIC EDITING

(71) Applicant: Christopher Renwick Alston, Vienna, VA (US)

(72) Inventor: Christopher Renwick Alston, Vienna, VA (US)

( * ) Notice: Subject to any disclaimer, the term of this patent is extended or adjusted under 35 U.S.C. 154(b) by 50 days.

(21) Appl. No.: 16/749,117

(22) Filed: Jan. 22, 2020

(65) Prior Publication Data

US 2020/0234682 A1 Jul. 23, 2020

Related U.S. Application Data

(60) Provisional application No. 62/795,928, filed on Jan. 23, 2019.

(51) Int. Cl.
| | |
|---|---|
| *G10H 1/36* | (2006.01) |
| *G10H 1/00* | (2006.01) |
| *H04L 9/06* | (2006.01) |
| *G06F 16/182* | (2019.01) |

(52) U.S. Cl.
CPC ....... *G10H 1/0041* (2013.01); *G06F 16/1827* (2019.01); *G10H 1/365* (2013.01); *G10H 1/366* (2013.01); *H04L 9/0637* (2013.01)

(58) Field of Classification Search
CPC ............... G10H 1/0025; G10H 1/0041; G10H 2240/131; G10H 1/36; G10H 1/365; G10H 1/366; G10H 2210/105; G10H 2210/111; G10H 2240/305; G10H 2240/175; G10H 2240/171; G10H 1/20; G10H 2240/325; G10H 1/0058; G10H 2210/005; G10H 2240/026; G10H 2240/115; G10H 7/00; G10H 2240/005; G10H 2240/046; G10H 2240/311
See application file for complete search history.

(56) References Cited

U.S. PATENT DOCUMENTS

| | | | | |
|---|---|---|---|---|
| 8,918,484 | B2 * | 12/2014 | Moncavage | H04N 21/8113 709/219 |
| 2002/0091455 | A1 * | 7/2002 | Williams | G10H 1/0058 700/94 |
| 2011/0041059 | A1 * | 2/2011 | Amarasingham | G11B 27/105 715/716 |
| 2011/0251840 | A1 * | 10/2011 | Cook | G10H 1/366 704/207 |
| 2014/0018947 | A1 * | 1/2014 | Ales | G11B 20/10 700/94 |
| 2014/0076125 | A1 * | 3/2014 | Kellett | G10H 1/0025 84/609 |
| 2015/0120308 | A1 * | 4/2015 | Leistikow | G10H 1/366 704/500 |
| 2016/0239876 | A1 * | 8/2016 | Ales | G06K 9/0053 |
| 2016/0358595 | A1 * | 12/2016 | Sung | G10H 1/368 |
| 2020/0234682 | A1 * | 7/2020 | Alston | G10H 1/361 |

* cited by examiner

*Primary Examiner* — Marlon T Fletcher
(74) *Attorney, Agent, or Firm* — Dentons US LLP

(57) ABSTRACT

This disclosure discloses various computing technologies that enable a user to insert a personal vocal content into an original song in a quick and simple manner, thereby potentially creating a derivative work of the original song. Additionally, these technologies enable a right holder of the original song to monitor the new derivative work in a granular, reliable, de-centralized, and secure manner.

54 Claims, 2 Drawing Sheets

COMPUTING TECHNOLOGIES FOR MUSIC EDITING

CROSS REFERENCE TO RELATED APPLICATIONS

The present application claims the benefit of U.S. Provisional Application Ser. No. 62/795,928 filed 23 Jan. 2019, which is incorporated herein by reference in its entirety for all purposes.

TECHNICAL FIELD

Generally, this disclosure relates to audio content processing. More particularly, this disclosure relates to music editing.

BACKGROUND

A user may desire to insert a personal vocal content into an original song (e.g., "Beat It" by Michael Jackson). As such, the user may sing the personal vocal content into a microphone of a computing device (e.g., laptop) such that the computing device may record an audio representation of the personal vocal content. Then, the user may operate the computing device to access the original song and identify a specific time range, within the original song, where the user desires to insert the audio representation. Then, the user replaces the specific time range within the original song with the audio representation (e.g., cutting, copying, and pasting). This process is complicated, time-consuming, and laborious.

If the original song is associated with a right holder and the user replaces the specific time range within the original song with the audio representation, then a new derivative work may be created, which the right holder may want to monitor. This form of monitoring is complicated, time-consuming, and laborious, without employing some form of a DRM technology for the new derivative work. Although various DRM technologies exist, these technologies are insufficiently granular to reliably track the derivative work over various communication networks, insufficiently reliable due to centralized natures thereof, and insufficiently secure against tampering.

SUMMARY

Generally, this disclosure enables various computing technologies for music editing. In particular, these technologies enable a user to insert a personal vocal content into an original song in a quick and simple manner, thereby potentially creating a derivative work of the original song. Additionally, these technologies enable a right holder of the original song to monitor the new derivative work in a granular, reliable, de-centralized, and secure manner.

In an embodiment, there is provided a method comprising: receiving, by a server, a first file from a first application running on a first client, wherein the first file includes a first musical composition formed via a first vocal content and an instrumental content, wherein the first vocal content corresponds to a first acoustic fingerprint associated with a first block of a blockchain accessible to the server; isolating, by the server, the first vocal content and the instrumental content; segmenting, by the server, the first vocal content into a plurality of defined organizational elements; receiving, by the server, a second file from a second application running on a second client, wherein the second file includes a second musical composition formed via a second vocal content; replacing, by the server, one of the defined organizational elements with the second vocal content such that a third musical composition is formed; forming, by the server, a second acoustic fingerprint of the third musical composition; associating, by the server, the second acoustic fingerprint with a second block of the blockchain, wherein the second block is downstream from the first block on the blockchain; causing, by the server, a third application running on a third client to play the third musical composition; incrementing, by the server, a play counter based on the third client playing the third musical composition, wherein the play counter is associated with the first block; and taking, by the server, an action based on the play counter.

DETAILED DESCRIPTION OF PREFERRED EMBODIMENTS

Figure 1:
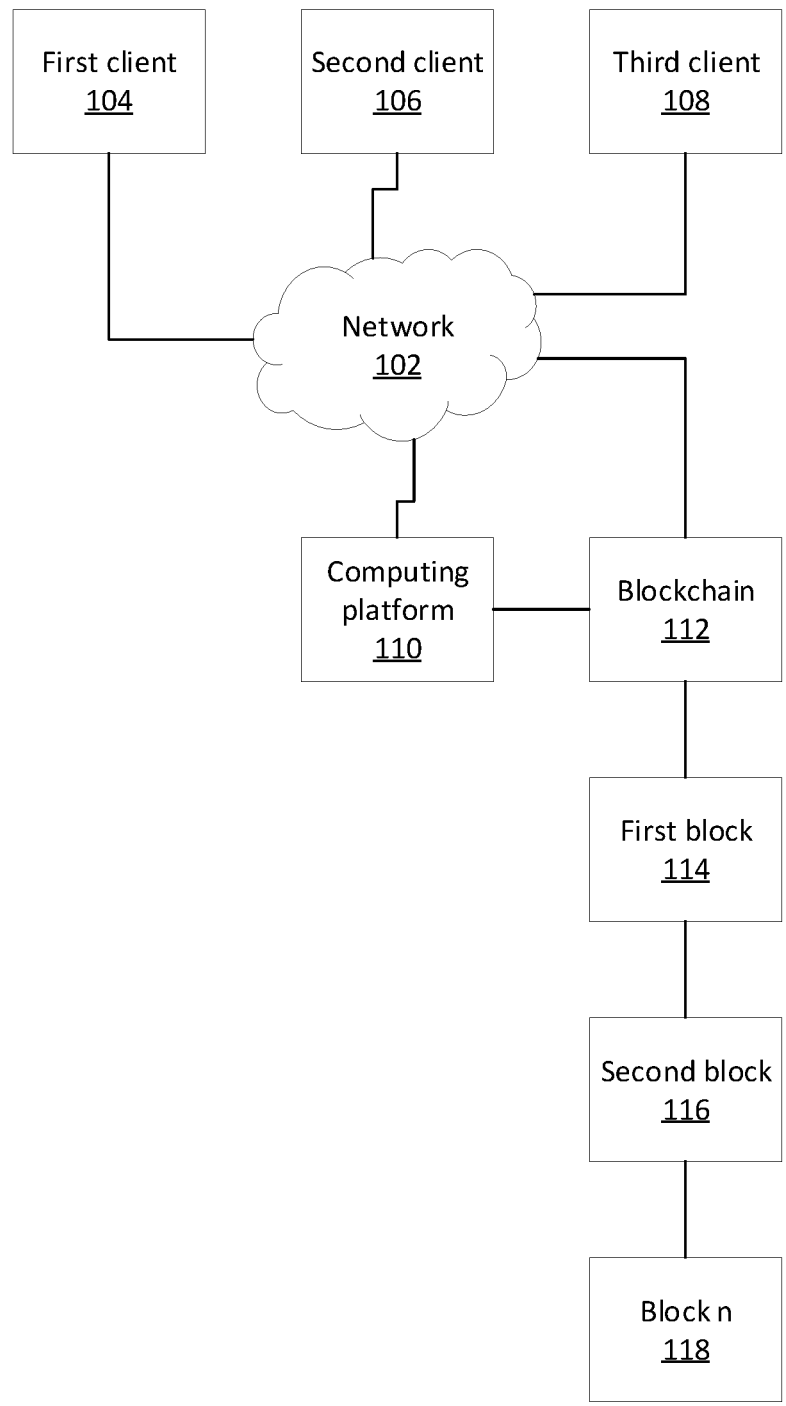
FIG. 1 shows a diagram of an embodiment of a system for music editing according to this disclosure.

Generally, this disclosure enables various computing technologies for music editing. In particular, these technologies enable the user to insert the personal vocal content into the original song in a more time-saving and more simple manner. Additionally, these technologies enable the right holder of the new derivative work to better monitor the new derivative work in a more granular, reliable, de-centralized, and secure manner. This disclosure is now described more fully with reference to various accompanying figures, in which some embodiments of this disclosure are shown. This disclosure may, however, be embodied in many different forms and should not be construed as necessarily being limited to only embodiments disclosed herein. Rather, these embodiments are provided so that this disclosure is thorough and complete, and fully conveys various concepts of this disclosure to skilled artisans.

Note that various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Likewise, as used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Similarly, as used herein, various singular forms "a," "an" and "the" are intended to include various plural forms as well, unless context clearly indicates otherwise. For example, a term "a" or "an" shall mean "one or more," even though a phrase "one or more" is also used herein.

Moreover, terms "comprises," "includes" or "comprising," "including" when used in this specification, specify a presence of stated features, integers, steps, operations, elements, or components, but do not preclude a presence and/or addition of one or more other features, integers, steps, operations, elements, components, or groups thereof. Furthermore, when this disclosure states that something is "based on" something else, then such statement refers to a basis which may be based on one or more other things as well. In other words, unless expressly indicated otherwise, as used herein "based on" inclusively means "based at least in part on" or "based at least partially on."

Additionally, although terms first, second, and others can be used herein to describe various elements, components, regions, layers, or sections, these elements, components, regions, layers, or sections should not necessarily be limited by such terms. Rather, these terms are used to distinguish one element, component, region, layer, or section from another element, component, region, layer, or section. As such, a first element, component, region, layer, or section discussed below could be termed a second element, component, region, layer, or section without departing from this disclosure.

Also, unless otherwise defined, all terms (including technical and scientific terms) used herein have the same meaning as commonly understood by one of ordinary skill in an art to which this disclosure belongs. As such, terms, such as those defined in commonly used dictionaries, should be interpreted as having a meaning that is consistent with their meaning in a context of a relevant art and should not be interpreted in an idealized or overly formal sense unless expressly so defined herein.

Hereby, all issued patents, published patent applications, and non-patent publications (including hyperlinked articles, web pages, and websites) that are mentioned in this disclosure are herein incorporated by reference in their entirety for all purposes, to same extent as if each individual issued patent, published patent application, or non-patent publication were specifically and individually indicated to be incorporated by reference. If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

FIG. 1 shows a diagram of an embodiment of a system for music editing according to this disclosure. In particular, a system 100 includes a network 102, a first client 104, a second client 106, and a third client 108. Also, the system 100 includes a computing platform 110 and a blockchain 112 including a first block 114, a second block 116, and a block n 118.

The network 102 includes a plurality of computing nodes interconnected via a plurality of communication channels, which allow for sharing of resources, applications, services, files, streams, records, information, or others. The network 102 can operate via a network protocol (e.g., Ethernet protocol, TCP/IP). The network 102 can have any scale (e.g., PAN, LAN, HAN, SAN, CAN, BAN, MAN, WAN, VPN, virtual network, satellite network, computer cloud network, internetwork, cellular network). The network 102 can include an intranet, an extranet, or others. The network 102 can include Internet. The network 102 can include other networks or allow for communication with other networks, whether sub-networks or distinct networks.

The first client 104, the second client 106, and the third client 108 are in communication (e.g., wired, wireless, waveguide, synchronous, asynchronous) with the network 102. The computing platform 110 is in communication (e.g., wired, wireless, waveguide, synchronous, asynchronous) with the network 102. The blockchain 112 (e.g., node) is in communication (e.g., wired, wireless, waveguide, synchronous, asynchronous) with the network 102 (although the blockchain 112 can avoid being in communication with the network 102).

The blockchain 112 can be a public blockchain, a private blockchain, or a hybrid public-private blockchain. The blockchain 112 (e.g., node) is in communication (e.g., wired, wireless, waveguide, synchronous, asynchronous) with the computing platform 110 not via the network 102 (although via the network 102 is possible). The blockchain 112 can be stored (including copies) internal to the computing platform 110 (e.g., on computing instance server) or external to the computing platform 110 (e.g., remote server). The blockchain 112 can be stored (including copies) internal to at least one of the first client 104, the second client 106, or the third client 108 or external to at least one of the first client 104, the second client 106, or the third client 108. The blockchain 112 can be distributed (including copies) among the computing platform, the first client 104, the second client 106, or the third client 108.

In some situations, the blockchain 112 can be avoided and various data structures can be used instead. Some examples of such data structures can include tables, hashes, arrays, queues, decks, stacks, tree, maps, heaps, graphs, lists, linked lists, Cartesian trees, pagodas, multiway trees, B-trees, or others. For example, nodes of trees can function as blocks of the blockchain 112.

Each of the first client 104, the second client 106, and the third client 108 includes a logic that is in communication with the computing platform 110 over the network 102 or the blockchain 112. When the logic is hardware-based, then at least one of the first client 104, the second client 106, and the third client 108 can include a desktop, a laptop, a tablet, a smartphone, a videogame console, or others. When the logic is hardware-based, then at least one of the first client 104, the second client 106, and the third client 108 can include an input device (e.g., microphone, mouse, keyboard, camera, touchscreen, videogame controller). Likewise, when the logic is hardware-based, then at least one of the first client 104, the second client 106, and the third client 108 can include an output device (e.g., speaker, display, headphone, joystick, videogame controller). The input device and the output device can be embodied in one unit (e.g., touchscreen, videogame controller). Likewise, when the logic is software-based, then at least one of the first client 104, the second client 106, and the third client 108 can include a set of instructions (e.g., software application, mobile app, browser, software module, executable file, data file, browser extension, dedicated logic). Whether the logic is hardware-based or software-based, the first client 104, the second client 106, and the third client 108 can be embodied identically or differently from each other in any permutational manner and, as such, the logic can be correspondingly be implemented identically or differently in any permutational manner. Regardless of how the logic is implemented, the logic enables each of the first client 104, the second client 106, and the third client 108 to communicate with the server 102 through the network 102 or the blockchain 112. Some examples of such communications can include requesting or receiving a resource or a service from the server 102 via a common framework (e.g., HTTP, HTTPS, FTP) or from the blockchain 112. At least two of the first client 104, the second client 106, or the third client 108 can be a single client or different clients.

The computing platform 110 includes a cloud computing environment defined via a plurality of servers, whether hardware or virtual, where the servers operate in concert (e.g., cluster of servers, grid of servers, group of servers) to perform a computing task (e.g., reading data, writing data, deleting data, collecting data, sorting data). For example, at least one of these servers can be an application server, a database server, or other server types. The computing platform 110 can include a mainframe, a supercomputer, or others. The servers can be housed in a data center, a server farm or others. The computing platform 110 can provide a plurality of computing services on-demand (e.g., IaaS, PaaS, SaaS). The computing platform 110 can providing computing services from a plurality of data centers spread across a plurality of availability zones in various global regions, where an availability zone can be a location that contains a plurality of data centers, while a region is a collection of availability zones in a geographic proximity connected by a low-latency network link. The computing platform 110 can enable a user to launch a plurality of virtual machines and replicate data in different availability zones to achieve a highly reliable infrastructure that is resistant to failures of individual servers or an entire data center. For example, the computing platform 110 can include Amazon Web Services, Microsoft Azure, Google Cloud, IBM cloud, or others.

Figure 2:
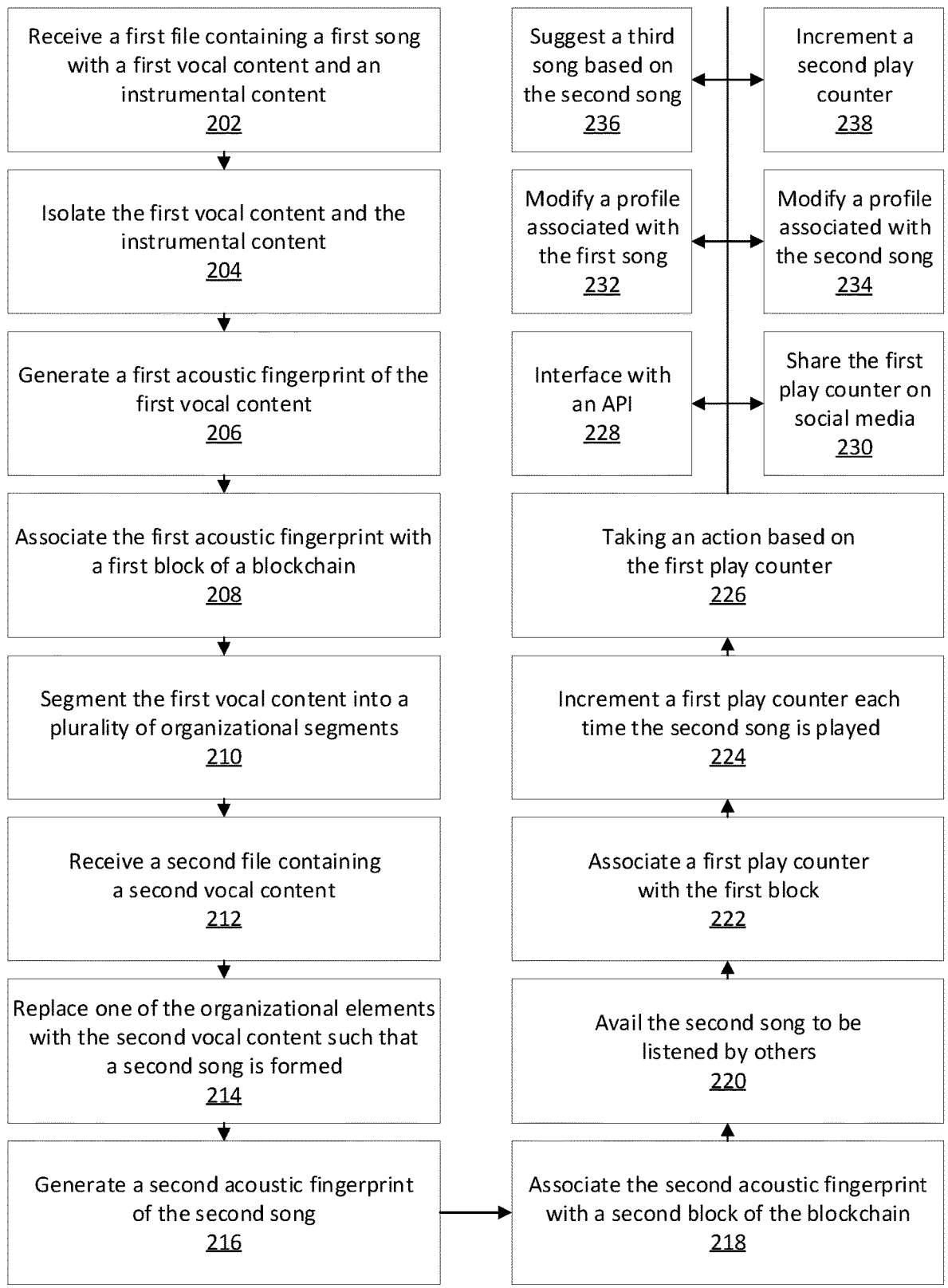
FIG. 2 shows a flowchart an embodiment of a process for music editing according to this disclosure.

FIG. 2 shows a flowchart an embodiment of a process for music editing according to this disclosure. In particular, a process 200 includes a plurality of blocks 202-238, any of which can be performed in real-time. The process 200 can be performed via the system 100.

In block 202, the computing platform 110 receives (e.g., wired, wireless, waveguide, synchronous, asynchronous) a first file (e.g., MP3, WAV) containing a first song (or another musical composition) with a first vocal content (e.g., artist singing, duet singing, choir singing) and an instrument content (e.g., piano, guitar, drums, violin, drums). The computing platform 110 receives the first file from a first application (e.g., browser, mobile app) running on the first client 104. The first vocal content can include or exclude lyrics (e.g., phrases). The first vocal content can be without any instrumental accompaniment (e.g., a cappella). Note that singing includes singing a melody or rapping a tune. In some situations, the first vocal content can already correspond to the first acoustic fingerprint associated with the first block of the blockchain before the first file is even received by the computing platform 110. This can occur when the first vocal content (or the instrumental content) has been previously acoustically fingerprinted (e.g., upon uploading by right holder) and, when the first client 104 uploads the first file to the computing platform 110, the first file is acoustically fingerprinted (or otherwise processed) and matched to the first acoustic fingerprint already on file.

In block 204, the computing platform 106 isolates the first vocal content and the instrumental content. This isolation can occur via reading the first file and then processing the first file such that the first vocal content and the instrumental content can be edited or mixed independent of each other.

In block 206, the computing platform 110 generates a first acoustic fingerprint of the first vocal content. This can happen when the first client 104 is associated with a right holder (e.g., music label). Note that the computing platform 110 can also generate the first acoustic fingerprint of the instrumental content or lyrics, if any. Also, note that the first acoustic fingerprint can be generated off the computing platform 110 (e.g., remote server) and be received by the computing platform 110 contemporaneous with the first file.

In block 208, the computing platform 110 associates the first acoustic fingerprint with a first block of a blockchain. As such, the first vocal content can correspond to the first acoustic fingerprint associated with the first block of the blockchain accessible to the computing platform 110. Note that the blockchain can be associated with the first file (e.g., first vocal content, instrumental content, lyrics) such that the first block and any other subsequent blocks are associated with the first file (e.g., first vocal content, instrumental content, lyrics), which helps to track derivative works off the first file (e.g., first vocal content, instrumental content, lyrics). For example, the blockchain can be specific to a song or to a component of the song (e.g., lyrics, vocals, instrumentals). As such, there can be a plurality of blockchains specific (e.g., one-to-one correspondence) to a plurality of songs or to a plurality of components of songs (e.g., lyrics, vocals, instrumentals). For example, there can be a first blockchain for a first song and a second blockchain for a second song. For example, there can be a first blockchain for lyrics of a first song, a second blockchain for vocals of the first song, and a third blockchain for instrumentals of the song. In some situations, the first block can contain the first acoustic fingerprint (e.g., first acoustic fingerprint written inside first block). In some situations, the first block does not contain the first acoustic fingerprint, but the first acoustic fingerprint is associated with the first block via an intermediary logic unit (e.g., variable, reference, pointer, object, data structure, database record, blockchain block).

In block 210, the computing platform 110 segments the first vocal content into a plurality of defined organizational segments. The defined organizational elements are various elements of song structure (e.g., chorus or refrain element, verse element, intro element, outro element) for various song forms (e.g., verse-chorus form, strophic form, twelve-bar blues). This information can be saved or exported in various suitable data structure forms.

In block 212, the computing platform 110 receives (e.g., wired, wireless, waveguide, synchronous, asynchronous) a second file (e.g., MP3, WAV) containing a second vocal content. Note that the second file can include an instrumental content (e.g., analog or digital piano, guitar, drums, violin, drums) for the second vocal content. The computing platform 110 receives the second file from a second application (e.g., browser, mobile app) running on the second client 106. The second file can include a second musical composition (e.g., song) formed via the second vocal content or the instrumental content. For example, the second vocal content can include a personal vocal content (e.g., user singing, duet singing, choir singing) sung into the microphone of the second client 106, whether with or without the instrumental content. The second vocal content can include or exclude lyrics (e.g., phrases). The second vocal content can be without any instrumental accompaniment (e.g., a cappella). For example, the second file can include a musical composition formed by the second vocal content without any instrumental accompaniment. Note that singing includes singing a melody or rapping a tune. In some situations, the first application can be the second application, where the first client 104 is the second client 106. In some situations, the first client 104 is not the second client 106 (e.g., different users or user profiles).

In block 214, the computing platform 110 replaces one of the defined organizational elements with the second vocal content such that a second song (or another musical composition) is formed. This replacement can occur in various ways. For example, this replacement can be performed via forming a defined organized structure of the first vocal content by the defined organizational elements (e.g., song structure blocks), cutting the one of the defined organizational elements from the defined organized structure, and pasting the second vocal content into a spot where the one of the defined organizational elements was previously positioned (and format converting accordingly). Likewise, this replacement can be performed via forming a defined timeline of the first vocal content by the defined organizational elements, deleting the one of the defined organizational elements from the timeline, and inserting the second vocal content into the timeline where the one of the defined organizational elements was previously positioned (and format converting accordingly). Once such replacement is done, then there can be a modified or a new file, which can be saved, shared, or exported. The modified or new file includes the first vocal content containing the second vocal content replacing the one of the defined organizational elements.

In some situations, there may be a desire to merge the first vocal content containing the second vocal content replacing the one of the defined organizational elements with the instrumental content, as sourced from the first file. Therefore, replacing the one of the defined organizational elements with the second vocal content can include merging the first vocal content with the instrumental content (a) according to a same timeline (e.g., synchronized as original) as before the first vocal content and the instrumental content were isolated and (b) while the first vocal content contains the second vocal content replacing the one of the defined organizational elements. As such, the modified or new filed (e.g., musical composition) can now include the instrumental content from the first file and the first vocal content containing the second vocal content replacing the one of the defined organizational elements.

Since the defined organizational elements (e.g., chorus or refrain element, verse element, intro element, outro element) can vary based on presence or absence of lyrics or instrumentals, there are various ways that segmentation or replacement can be performed. For example, within the first vocal content, a chorus element may repeat within a predefined time period, whereas a verse element may not. For example, the predefined time period can include (e.g. within about 5, 10, 15, 20, 25, 30, 35, 40, 45, 50, 55, 60, 65, 70, 75, 80, 85, 90, 95, 100, 105, 110, 120, 130, 140, 150, 160, 170, 180 seconds or more) or time length of the first vocal content (or instrumental content or lyrics content) or entire musical composition.

For example, if the first vocal content does not contain any lyrics (e.g., a cappella), then, where the defined organizational elements include the chorus element, segmenting the first vocal content into the defined organizational elements can include identifying a plurality of sound patterns (e.g., vocal, instrumental, lyrics) within the first vocal content, identifying some of the sound patterns that repeat at least once (e.g., two, three, four) within the predefined time period, and associating these sound patterns with the chorus elements. As such, replacing the one of the defined organizational elements with the second vocal content can include replacing at least one of the chorus elements with the second vocal content such that a musical composition is formed. Correspondingly, if the defined organizational elements include the verse element, then, where segmenting the first vocal content into the defined organizational elements can include identifying the sound patterns within the first vocal content, identifying some of the sound patterns that do not repeat within the predefined time period, and associating these sound patterns with the verse elements. As such, replacing the one of the defined organizational elements with the second vocal content can include not replacing the verse elements with the second vocal content. Therefore, at least one of the chorus elements is replaced with the second vocal content and at least one of the verse elements is not replaced with the second vocal content. Note that a vice versa configuration is possible, where the verse elements can be identified within the first vocal content based on lack of repetitions within the defined time period within the first vocal content and the second vocal content can replace at least one of the verse element. Similarly, the chorus elements can be identified within the first vocal content based on repetitions within the defined time period within the first vocal content and the second vocal content does not replace at least one of the chorus elements within the first vocal content. Note that the second vocal content can replace or not replace multiple defined organizational elements, whether serially or in parallel. For example, the second vocal content can replace or not replace some, many, most, or all chorus elements or some, many, most, or all verse elements.

For example, if the first vocal content includes a plurality of lyrics (e.g., phrases) or a plurality of melody sections (e.g. pure tune), then, where the defined organizational elements include the chorus elements or the verse elements, the lyrics are identified (e.g., based on audio-to-text conversion and comparative analysis) or the melody sections are identified (e.g., based on pitch, frequency, harmony, or cadence comparative analysis) and processed for repetition or lack thereof, as described herein. As such, the lyrics (or the melody sections) that repeat, as described herein, can be flagged as the chorus elements and the lyrics (or the melody sections) that do not repeat, as described herein, can be flagged as the verse elements. Therefore, replacing the one of the defined organizational elements with the second vocal content can include replacing or not replacing some of the chorus elements based on the lyrics (or the melody sections) or replacing or not replacing some of the verse elements based on the lyrics (or the melody sections). Note that the second vocal content can replace or not replace multiple defined organizational elements, whether serially or in parallel, whether multiple defined organizational elements are inclusive or exclusive of lyrics or melody sections. For example, the second vocal content can replace or not replace some, many, most, or all chorus elements or some, many, most, or all verse elements, whether any of these elements are inclusive or exclusive of lyrics or melody sections.

In block 216, the computing platform 110 generates a second acoustic fingerprint of the second song, which is different from the first acoustic fingerprint. Note that the computing platform 110 can generate the second acoustic fingerprint of the instrumental content for the second vocal content, if this instrumental content for the second vocal content was also used in replacing the one of the defined organizational elements with the second vocal content. Also, note that the second acoustic fingerprint can be generated off the computing platform 110 (e.g., remote server) and be sent to the computing platform 110.

In block 218, the computing platform 110 associates the second acoustic fingerprint with a second block of the blockchain. As such, the second vocal content can correspond to the second acoustic fingerprint associated with the second block of the blockchain accessible to the computing platform 110. In some situations, the second block can contain the second acoustic fingerprint (e.g., second acoustic fingerprint written inside second block). In some situations, the second block does not contain the second acoustic fingerprint, but the second acoustic fingerprint is associated with the second block via an intermediary logic unit (e.g., variable, reference, pointer, object, data structure, database record, blockchain block).

Note that the blockchain already is associated with the first file (e.g., first vocal content, instrumental content, lyrics) such that the first block and any other subsequent blocks are associated with the first file (e.g., first vocal content, instrumental content, lyrics), which helps to track derivative works off the first file (e.g., first vocal content, instrumental content, lyrics). Therefore, the second block of the blockchain is downstream from the first block, yet still on the blockchain, which helps to determine if the second vocal content, with or without lyrics, or its potential instrumental content, is a derivative work off the first file (e.g., first vocal content, instrumental content, lyrics). In other words, the blockchain tracks the first song (original work) and any derivatives thereof (second song, third song, fourth song, or others deriving from or for each vocal, instrumental, or lyric content of first song). As such, in some situations, there can be a plurality of blockchains for a plurality of songs (or other musical compositions), in a one-to-one-correspondence with each other, with each of such blockchains tracking a plurality of derivative works for each of such songs. However, note that other forms of correspondence are possible. For example, there can be a plurality of blockchains per song, each tracking different component of song (e.g., lyrics, vocal, instrumental).

In block 220, the computing platform 110 avails the second song to be listened by others. This can occur by the computing platform 110 granting a read access for the modified or new file to other clients in communication with the computing platform 110. For example, granting the read access can include allowing downloading of the modified or new file. For example, granting the read access can include allowing streaming of the modified or new file. For example, these clients can include the first client 104, the second client 106, the third client 108, a fourth client, or others. In some situations, the third client 108 is different from the first client 104 or the second client 106 (e.g., different users, different user profiles).

In block 222, the computing platform 110 associates a first play counter with the first block. Once other clients begin to read (e.g., listen, download, stream) to the modified or new file, then the computing platform initiates or associates the first play counter to count how many times the modified or new file has been read. The computing platform 110 can also track, which clients and when have listened to the modified or new file.

In block 224, the computing platform 110 increments the first play counter each time the second song is played (although the first play counter can be incremented not each time but at other frequencies like every X plays). The first play counter is associated with the first block. Each time the modified or new file is played (or at other frequencies), the first play counter is incremented by one (or another value), which helps to track usage of the second song via the modified or new file for the right holder, since the right holder is associated with the first block. For example, the computing platform 110 can cause a third application running on the third client 108 to play the second song, which can be considered a third musical composition with the first song being the first musical composition and the second vocal content being considered the second musical composition.

In block 226, the computing platform 110 takes an action based on the first play counter. Some of such actions can include sending or receiving messages, pushing or pulling messages, creating or modifying or deleting data structures, as described herein, or others.

In block 228, the computing platform 110 interfaces with an API, whether local to or remote from the computing platform 110 (e.g., server). The API can be an e-commerce API, which can request a value message (e.g., credit or debit) to be generated or sent, as requested via the computing platform 110. For example, for each time the first play counter is incremented, the computing platform 110 can be programmed to interface with the API to request the value message to be generated or sent. For example, periodically (e.g., seconds, minutes, hours, days, weeks), the computing platform 110 can query the first play counter and interface with the API to request a value message to be generated or sent based on a value of the first play counter at that time. For example, the API can enable crypto-currency units (e.g., Bitcoins) to be transferred between crypto-wallet addresses, where one of such addresses (sending) is associated with a client playing the modified or new file and one of such addresses (receiving) is associated with the first block of the blockchain (e.g., right holder).

In block 230, the computing platform 110 shares the first play counter on a social media networking service. The social media networking service can be local to or remote from the computing platform 110. For example, the social media networking service can include a server (e.g., Facebook, Twitter, Instagram) programming for communication with the computing platform 110. This sharing can be to user profiles and helpful for content promotion.

In block 232, the computing platform 110 modifies a user profile associated with the first song. This user profile can be associated with the right holder and be modified based on how many clients are playing or have played the modified or new file. This can be helpful for auditing various API operations, as described herein.

In block 234, the computing platform 110 modifies a user profile associated with the second song. This user profile can be associated with the user who created the modified or new file (derivative work) and be modified based on how many clients are playing or have played the modified or new file. This can be helpful for auditing various API operations, as described herein.

In some situations, a user profile associated with the second vocal content may not be same as the user profile associated with formation of the modified or new file. In those situations, that user profile can also be modified, as described herein, to allow for downstream derivative work monitoring of the second vocal content.

In block 236, the computing platform 110 suggests a third song based on the second song. If the first play counter does not satisfy a certain play threshold, then the user who created the modified or new file (derivative work) can be suggested a third song based on similarities resulting from vocal, instrumental, or lyrics analysis of the second song and the third song, as described herein.

In block 238, the computing platform 110 increments a second play counter. Once other clients begin to read (e.g., listen) to the modified or new file, then the computing platform initiates or associates the second play counter to count how many times the modified or new file has been read. The computing platform 110 can also track, which clients and when listened to modified or new file. However, the second play counter is associated with the second block of the blockchain, which is associated with the user who created the modified or new file (derivative work). As such, the second play counter can be incremented each time the second song is played. Each time the modified or new file is played, the second play counter is incremented by one (or another value), which helps to track usage of the second song via the modified or new file for the right holder. Since the first song is upstream of the second song, the first play counter can be equal or higher or greater in value than the second play counter because the first play counter is incremented when the first song is played or the second song is played, whereas the second play counter is incremented when the second song is played (or works deriving from second song are played), since the second song is a derivative work of the first song. For example, the first play counter can be not less in value than the second play counter.

In some situations, the computing platform 110 can be programmed to identify a potential edit (e.g., audio quality, audio effect) to the modified or new file, which can be before the second acoustic fingerprint is formed. The potential edit is based on the first vocal content containing the second vocal content replacing the one of the defined organizational elements. The computing platform 110 can suggest (e.g., visually, audibly) the potential edit to the second application, which can be before the second acoustic fingerprint is formed. The computing platform 110 can edit the modified or new file, which can be before the second acoustic fingerprint is formed. The modified or new file can be edited based on the potential edit requested by the second application, which can be before the second acoustic fingerprint is formed.

In some situations, the computing platform 110 can be programmed to causing the modified or new file to begin play where the second vocal content begins in the modified or new file (e.g., 45 seconds into song) without a manual user skipping to the second vocal content in the modified or new file.

In some situations, the computing platform 110 can be programmed to identify at least one of a beats per minute or a key of the second vocal content, which can be before the modified or new file is formed. The computing platform 110 can be programmed to suggest an audio content to the second client 106 based on at least one of the beats per minute or the key. As such, replacing the one of the defined organizational elements with the second vocal content can include inserting at least some of the audio content into the first vocal content, where the second acoustic fingerprint can be formed based on the modified or new file including at least some of that audio content. Since that audio content may be original itself, then the audio content (e.g., vocals, instrumentals, lyrics) can be associated with a block of another blockchain, where that block of another blockchain can be associated with another play counter for that audio content. Therefore, that play counter can be incremented based on the other clients playing the modified or new file. Likewise, the first play counter or the second play counter can also be correspondingly incremented.

In some situations, the computing platform 110 can be programmed to segmenting the first vocal content into the defined organizational elements inclusive of identifying the chorus element with lyrics based on a repetition of the chorus element (or lyrics) within the first vocal content. The computing platform 110 can be programmed to suggest an audio content to the second application based on the lyrics. As such, replacing the one of the defined organizational elements with the second vocal content can include inserting at least some of the audio content into the first vocal content, where the second acoustic fingerprint can be formed based on the modified or new file including at least some of that audio content. Since that audio content may be original itself, then the audio content (e.g., vocals, instrumentals, lyrics) can be associated with a block of another blockchain, where that block of another blockchain can be associated with another play counter for that audio content. Therefore, that play counter can be incremented based on the other clients playing the modified or new file. Likewise, the first play counter or the second play counter can also be correspondingly incremented.

In some situations, when the second vocal content includes a plurality of lyrics, the computing platform 110 can be programmed to identify the lyrics, which can be before the second acoustic fingerprint is formed. The computing platform 110 can be programmed to identify a theme in the lyrics (e.g., audio-to-text conversion, context analysis, sentiment analysis), which can be before the second acoustic fingerprint is formed. The computing platform 110 can be programmed to identify an audio content related to the theme (e.g., database record matching based on text), which can be before the second acoustic fingerprint is formed. The computing platform 110 can be programmed to suggest the audio content to the second application based on the lyrics, which can be before the second acoustic fingerprint is formed. As such, replacing the one of the defined organizational elements with the second vocal content can include inserting at least some of the audio content into the first vocal content, where the second acoustic fingerprint can be formed based on the modified or new file including at least some of that audio content. Since that audio content may be original itself, then the audio content (e.g., vocals, instrumentals, lyrics) can be associated with a block of another blockchain, where that block of another blockchain can be associated with another play counter for that audio content. Therefore, that play counter can be incremented based on the other clients playing the modified or new file. Likewise, the first play counter or the second play counter can also be correspondingly incremented.

In some situations, where the second file includes the second vocal content without any instrumental accompaniment, the computing platform 110 can be programmed to evaluate at least one of a pitch or a chord progression of the second vocal content and generate a list of library selections based on at least one of the pitch or the chord progression, where the list of library selections corresponds to a plurality of instruments that can play the second vocal content. For example, the second vocal content can include a personal vocal content (e.g., singing) and the list of library selections includes data for conversion of the personal vocal content into an instrumental form (e.g., trumpet) such that an output is generated in such form (e.g., sounds like trumpet). For example, personal singing can thereby be converted to sound like trumpet (or another instrument). As such, the computing platform 110 can be programmed to receive a user selection of one of the library selections from the second client 106 and generate an audio content based on the selection such that the audio content contains the second vocal content in instrumental form (e.g., trumpet form) based on the selection. Accordingly, replacing the one of the defined organizational elements with the second vocal content can include replacing the one of the defined organizational elements with the audio content (e.g., personal singing converted into trumpet form).

In some situations, the computing platform 110 includes a server that can be programmed to implements a web socket technique (or equivalent thereof) such that the server can be programmed to grant a write access (e.g., modify) to a collaborating user operating a client, as described herein, which can be before the second acoustic fingerprint is formed. The write access is for the second vocal content such that the second client 106 and this client can collaboratively real-time edit the second vocal content based on the web socket technique, which can be before the second acoustic fingerprint is formed.

In some situations, the computing platform 110 can be programmed to perform a comparison between the first song and the second song, which can be before the second acoustic fingerprint is associated with the second block. The computing platform 110 can be programmed to determine, responsive to the comparison, whether the second song is sufficiently original relative to the first song based on a plurality of criteria. For example, at least one of the criteria can includes a cadence of at least one of the first song or the second song. For example, at least one of the criteria can includes a percentage of change of the first vocal content containing the second vocal content replacing the one of the defined organizational elements in the second song relative to the first vocal content of the first song. As such, the second acoustic fingerprint can be associated with the second block of the blockchain based on the second song being determined to be sufficiently original relative to the first song (e.g., avoid duplicate blocks, keeps blockchain tightly organized).

In addition, features described with respect to certain example embodiments may be combined in or with various other example embodiments in any permutational or combinatory manner. Different aspects or elements of example embodiments, as disclosed herein, may be combined in a similar manner. The term "combination", "combinatory," or "combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to be-come coupled to other data processing systems or remote printers or storage devices through intervening private or public networks. Modems, cable modems, and Ethernet cards are just a few of the available types of network adapters.

This disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a port-able compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or pro-gram statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, FPGA, or PLA may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer soft-ware, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as dis-closed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required be-fore, after, and/or concurrently with example embodiments, as disclosed herein. Note that any and/or all methods and/or processes, at least as disclosed herein, can be at least partially performed via at least one entity or actor in any manner.

Although preferred embodiments have been depicted and described in detail herein, skilled artisans know that various modifications, additions, substitutions and the like can be made without departing from spirit of this disclosure. As such, these are considered to be within the scope of the disclosure, as defined in the following claims.

What is claimed is:

1. A method comprising:
receiving, by a server, a first file from a first application running on a first client, wherein the first file includes a first musical composition formed via a first vocal content and an instrumental content, wherein the first vocal content corresponds to a first acoustic fingerprint associated with a first block of a blockchain accessible to the server;
isolating, by the server, the first vocal content and the instrumental content;
segmenting, by the server, the first vocal content into a plurality of defined organizational elements;
receiving, by the server, a second file from a second application running on a second client, wherein the second file includes a second musical composition formed via a second vocal content;
replacing, by the server, one of the defined organizational elements with the second vocal content such that a third musical composition is formed;
forming, by the server, a second acoustic fingerprint of the third musical composition;
associating, by the server, the second acoustic fingerprint with a second block of the blockchain, wherein the second block is downstream from the first block on the blockchain;
causing, by the server, a third application running on a third client to play the third musical composition;
incrementing, by the server, a play counter based on the third client playing the third musical composition, wherein the play counter is associated with the first block; and
taking, by the server, an action based on the play counter.

2. The method of claim 1, wherein the first application is the second application, wherein the first client is the second client.

3. The method of claim 2, wherein the first vocal content corresponds to the first acoustic fingerprint associated with the first block of the blockchain before the first file is received by the server.

4. The method of claim 1, wherein the first client is not the second client, wherein the third client is not the first client and is not the second client.

5. The method of claim 1, wherein the first block contains the first acoustic fingerprint.

6. The method of claim 1, wherein the first block does not contain the first acoustic fingerprint, wherein the first acoustic fingerprint is associated with the first block via an intermediary logic unit.

7. The method of claim 1, wherein the first vocal content does not contain any lyrics, wherein the defined organizational elements include a chorus element, wherein segmenting the first vocal content into the defined organizational elements includes identifying a plurality of sound patterns within the first vocal content, identifying at least one of the sound patterns that repeats at least once within a predefined time period, and associating the at least one of the sound patterns that repeats at least once within the predefined time period with the chorus element, wherein replacing the one of the defined organizational elements with the second vocal content includes replacing the chorus element with the second vocal content such that the third musical composition is formed.

8. The method of claim 7, wherein segmenting the first vocal content into the defined organizational elements includes identifying the sound patterns within the first vocal content, identifying the at least one of the sound patterns that repeats at least twice within the predefined time period, and associating the at least one of the sound patterns that repeats at least twice within the predefined time period with the chorus element.

9. The method of claim 7, wherein the defined organizational elements include a verse element, wherein segmenting the first vocal content into the defined organizational elements includes identifying the sound patterns within the first vocal content, identifying at least one of the sound patterns that does not repeat within the predefined time period, and associating the at least one of the sound patterns that does not repeat within the predefined time period with the verse element, wherein replacing the one of the defined organizational elements with the second vocal content includes not replacing the verse element with the second vocal content.

10. The method of claim 1, wherein the first vocal content does not contain any lyrics, wherein the defined organizational elements include a verse element, wherein segmenting the first vocal content into the defined organizational elements includes identifying a plurality of sound patterns within the first vocal content, identifying at least one of the sound patterns that does not repeat within a predefined time period, and associating the at least one of the sound patterns that does not repeat within the predefined time period with the verse element, wherein replacing the one of the defined organizational elements with the second vocal content includes replacing the verse element with the second vocal content such that the third musical composition is formed.

11. The method of claim 10, wherein the defined organizational elements include a chorus element, wherein segmenting the first vocal content into the defined organizational elements includes identifying the sound patterns within the first vocal content, identifying at least one of the sound patterns that does repeats at least once within the predefined time period, and associating the at least one of the sound patterns that repeat at least once within the predefined time period with the chorus element, wherein replacing the one of the defined organizational elements with the second vocal content includes not replacing the chorus element with the second vocal content.

12. The method of claim 11, wherein segmenting the first vocal content into the defined organizational elements includes identifying the sound patterns within the first vocal content, identifying the at least one of the sound patterns that repeats at least twice within the predefined time period, and associating the at least one of the sound patterns that repeats at least twice within the predefined time period with the chorus element.

13. The method of claim 1, wherein the first vocal content includes a plurality of lyrics, wherein the defined organizational elements include a chorus element, wherein segmenting the first vocal content into the defined organizational elements includes identifying a plurality of sound patterns, identifying at least one of the sound patterns that repeats at least once within a predefined time period, and associating the at least one of the sound patterns that repeats at least once within the predefined time period with the chorus element, wherein replacing the one of the defined organizational elements with the second vocal content includes replacing the chorus element with the second vocal content such that the third musical composition is formed.

14. The method of claim 13, wherein segmenting the first vocal content into the defined organizational elements includes identifying the sound patterns within the first vocal content, identifying the at least one of the sound patterns that repeats at least twice within the predefined time period, and associating the at least one of the sound patterns that repeats at least twice within the predefined time period with the chorus element.

15. The method of claim 13, wherein the defined organizational elements include a verse element, wherein segmenting the first vocal content into the defined organizational elements includes identifying the sound patterns within the first vocal content, identifying at least one of the sound patterns that does not repeat within the predefined time period, and associating the at least one of the sound patterns that does not repeat within the predefined time period with the verse element, wherein replacing the one of the defined organizational elements with the second vocal content includes not replacing the verse element with the second vocal content.

16. The method of claim 13, wherein the lyrics include a plurality of phrases, wherein identifying the at least one of the sound patterns that repeats at least once within the predefined time period includes identifying the phrases and identifying at least one of the phrases that repeats at least once within the predefined time period, wherein the at least one of the sound patterns that repeats at least once within the predefined time period is associated with the chorus element based on the at least one of the phrases that repeats at least once within the predefined time period, wherein replacing the one of the defined organizational elements with the second vocal content includes replacing the at least one of the phrases that repeats at least once within the predefined time period with the second vocal content such that the third musical composition is formed.

17. The method of claim 16, wherein the at least one of the sound patterns that repeats at least once within the predefined time period is associated with the chorus element based on the at least one of the phrases that repeats at least twice within the predefined time period.

18. The method of claim 16, wherein the defined organizational elements include a verse element, wherein segmenting the first vocal content into the defined organizational elements includes identifying at least one of the sound patterns that does not repeat within the predefined time period based on identifying at least one of the phrases that does not repeat within the predefined time period, wherein the at least one of the sound patterns that does not repeat within the predefined time period is associated with the verse element based on the at least one of the phrases that does not repeat within the predefined time period, wherein replacing the one of the defined organizational elements with the second vocal content includes not replacing the at least one of the phrases that does not repeat within the predefined time period with the second vocal content.

19. The method of claim 13, wherein the lyrics include a plurality of melody sections, wherein identifying the at least one of the sound patterns that repeats at least once within the predefined time period includes identifying the melody sections and identifying at least one of the melody sections that repeats at least once within the predefined time period, wherein the at least one of the sound patterns that repeats at least once within the predefined time period is associated with the chorus element based on the at least one of the melody sections that repeats at least once within the predefined time period, wherein replacing the one of the defined organizational elements with the second vocal content includes replacing the at least one of the melody sections that repeats at least once within the predefined time period with the second vocal content such that the third musical composition is formed.

20. The method of claim 19, wherein the at least one of the sound patterns that repeats at least once within the predefined time period is associated with the chorus element based on the at least one of the melody sections that repeats at least twice within the predefined time period.

21. The method of claim 16, wherein the defined organizational elements include a verse element, wherein segmenting the first vocal content into the defined organizational elements includes identifying at least one of the sound patterns that does not repeat within the predefined time period based on identifying at least one of the melody sections that does not repeat within the predefined time period, wherein the at least one of the sound patterns that does not repeat within the predefined time period is associated with the verse element based on the at least one of the melody sections that does not repeat within the predefined time period, wherein replacing the one of the defined organizational elements with the second vocal content includes not replacing the at least one of the melody sections that does not repeat within the predefined time period with the second vocal content.

22. The method of claim 1, wherein the first vocal content includes a plurality of lyrics, wherein the defined organizational elements include a verse element, wherein segmenting the first vocal content into the defined organizational elements includes identifying a plurality of sound patterns, identifying at least one of the sound patterns that does not repeat within a predefined time period, and associating the at least one of the sound patterns that does not repeat within the predefined time period with the verse element, wherein replacing the one of the defined organizational elements with the second vocal content includes replacing the verse element with the second vocal content such that the third musical composition is formed.

23. The method of claim 22, wherein the defined organizational elements include a chorus element, wherein segmenting the first vocal content into the defined organizational elements includes identifying the sound patterns within the first vocal content, identifying at least one of the sound patterns that repeats at least once within the predefined time period, and associating the at least one of the sound patterns that repeats at least once within the predefined time period with the chorus element, wherein replacing the one of the defined organizational elements with the second vocal content includes not replacing the chorus element with the second vocal content.

24. The method of claim 23, wherein segmenting the first vocal content into the defined organizational elements includes identifying the sound patterns within the first vocal content, identifying the at least one of the sound patterns that repeats at least twice within the predefined time period, and associating the at least one of the sound patterns that repeats at least twice within the predefined time period with the chorus element.

25. The method of claim 22, wherein the lyrics include a plurality of phrases, wherein identifying the at least one of the sound patterns that does not repeat within the predefined time period includes identifying the phrases and identifying at least one of the phrases that does not repeat within the predefined time period, wherein the at least one of the sound patterns that does not repeat within the predefined time period is associated with the verse element based on the at least one of the phrases that does not repeat within the predefined time period, wherein replacing the one of the defined organizational elements with the second vocal content includes replacing the at least one of the phrases that does not repeat within the predefined time period with the second vocal content such that the third musical composition is formed.

26. The method of claim 25, wherein the defined organizational elements include a chorus element, wherein segmenting the first vocal content into the defined organizational elements includes identifying at least one of the sound patterns that repeats at least once within the predefined time period based on identifying at least one of the phrases that repeats at least once within the predefined time period, wherein the at least one of the sound patterns that repeats at least once within the predefined time period is associated with the chorus element based on the at least one of the phrases that repeats at least once within the predefined time period, wherein replacing the one of the defined organizational elements with the second vocal content includes not replacing the at least one of the phrases that repeats at least once within the predefined time period with the second vocal content.

27. The method of claim 26, wherein the at least one of the sound patterns that repeats at least once within the predefined time period is associated with the chorus element based on the at least one of the phrases that repeats at least twice within the predefined time period.

28. The method of claim 22, wherein the lyrics include a plurality of melody sections, wherein identifying the at least one of the sound patterns that does not repeat within the predefined time period includes identifying the melody sections and identifying at least one of the melody sections that does not repeat within the predefined time period, wherein the at least one of the sound patterns that does not repeat within the predefined time period is associated with the verse element based on the at least one of the melody sections that does not repeat within the predefined time period, wherein replacing the one of the defined organizational elements with the second vocal content includes replacing the at least one of the melody sections that does not repeat within the predefined time period with the second vocal content such that the third musical composition is formed.

29. The method of claim 25, wherein the defined organizational elements include a chorus element, wherein segmenting the first vocal content into the defined organizational elements includes identifying at least one of the sound patterns that repeats at least once within the predefined time period based on identifying at least one of the melody sections that repeats at least once within the predefined time period, wherein the at least one of the sound patterns that repeats at least once within the predefined time period is associated with the chorus element based on the at least one of the melody sections that repeats at least once within the predefined time period, wherein replacing the one of the defined organizational elements with the second vocal content includes not replacing the at least one of the melody sections that repeats at least once within the predefined time period with the second vocal content.

30. The method of claim 29, wherein the at least one of the sound patterns that repeats at least once within the predefined time period is associated with the chorus element based on the at least one of the melody sections that repeats at least twice within the predefined time period.

31. The method of claim 1, wherein the second file includes the second musical composition formed by the second vocal content without any instrumental accompaniment.

32. The method of claim 1, wherein replacing the one of the defined organizational elements with the second vocal content includes merging the first vocal content with the instrumental content (a) according to a same timeline as before the first vocal content and the instrumental content were isolated and (b) while the first vocal content contains the second vocal content replacing the one of the defined organizational elements, wherein the third musical composition includes the instrumental content and the first vocal content containing the second vocal content replacing the one of the defined organizational elements.

33. The method of claim 1, wherein the second block contains the second acoustic fingerprint.

34. The method of claim 1, wherein the second block does not contain the second acoustic fingerprint, wherein the second acoustic fingerprint is associated with the second block via an intermediary logic unit.

35. The method of claim 1, wherein taking the action includes interfacing with an application programming interface local to the server.

36. The method of claim 1, wherein taking the action includes interfacing with an application programming interface remote from the server.

37. The method of claim 1, wherein taking the action includes sharing the play counter on a social media networking service.

38. The method of claim 1, wherein taking the action includes modifying a user profile associated with the first musical composition.

39. The method of claim 1, wherein taking the action includes modifying a user profile associated with the second musical composition.

40. The method of claim 1, wherein taking the action includes modifying a user profile associated with the third musical composition.

41. The method of claim 1, wherein taking the action includes suggest a musical composition based on the third musical composition.

42. The method of claim 1, wherein the play counter is a first play counter, wherein taking the action includes incrementing a second play counter associated with the third musical composition.

43. The method of claim 42, wherein the first play counter is equal to or greater in value to the second play counter.

44. The method of claim 42, wherein the first play counter is not less in value than the second play counter.

45. The method of claim 1, further comprising:
identifying, by the server, a potential edit to the third musical composition before the second acoustic fingerprint is formed, wherein the potential edit is based on the first vocal content containing the second vocal content replacing the one of the defined organizational elements;
suggesting, by the server, the potential edit to the second application before the second acoustic fingerprint is formed; and
editing, by the server, the third musical composition before the second acoustic fingerprint is formed, wherein the third musical composition is edited based on the potential edit requested by the second application before the second acoustic fingerprint is formed.

46. The method of claim 1, wherein causing the third application to play the third musical composition includes causing the third musical composition to begin play where the second vocal content begins in the third musical composition without a user skipping to the second vocal content in the third musical composition.

47. The method of claim 1, further comprising:
identifying, by the server, at least one of a beats per minute or a key of the second vocal content before the third musical composition is formed;
suggesting, by the server, an audio content to the second application based on the at least one of the beats per minute or the key, wherein replacing the one of the defined organizational elements with the second vocal content includes inserting at least some of the audio content into the first vocal content, wherein the second acoustic fingerprint is formed based on the third musical composition including the at least some of the audio content, wherein the blockchain is a first blockchain, wherein the at least some of the audio content is associated with a third block of a second blockchain, wherein the play counter is a first play counter, wherein the third block is associated with a second play counter, wherein the second play counter is incremented based on the third client playing the third musical composition.

48. The method of claim 1, wherein the defined organizational elements include a chorus element, wherein the chorus element includes a plurality of lyrics, wherein segmenting the first vocal content into the defined organizational elements includes identifying the chorus element based on a repetition thereof within the first vocal content, and further comprising:
suggesting, by the server, an audio content to the second application based on the lyrics, wherein replacing the one of the defined organizational elements includes inserting at least some of the audio content into the first vocal content, wherein the second acoustic fingerprint is formed based on the third musical composition including the at least some of the audio content, wherein the blockchain is a first blockchain, wherein the at least some of the audio content is associated with a third block of a second blockchain, wherein the play counter is a first play counter, wherein the third block is associated with a second play counter, wherein the second play counter is incremented based on the third client playing the third musical composition.

49. The method of claim 1, wherein the second vocal content includes a plurality of lyrics, and further comprising:
identifying, by the server, the lyrics before the second acoustic fingerprint is formed;
identifying, by the server, a theme in the lyrics before the second acoustic fingerprint is formed;
identifying, by the server, an audio content related to the theme before the second acoustic fingerprint is formed; and
suggesting, by the server, the audio content to the second application based on the lyrics before the second acoustic fingerprint is formed, wherein replacing the one of the defined organizational elements includes inserting at least some of the audio content into the first vocal content, wherein the second acoustic fingerprint is formed based on the third musical composition including the at least some of the audio content, wherein the blockchain is a first blockchain, wherein the at least some of the audio content is associated with a third block of a second blockchain, wherein the play counter is a first play counter, wherein the third block is associated with a second play counter, wherein the second play counter is incremented based on the third client playing the third musical composition.

50. The method of claim 1, wherein the second file includes the second musical composition formed by the second vocal content without any instrumental accompaniment, and further comprising:
   evaluating, by the server, at least one of a pitch or a chord progression of the second vocal content;
   generating, by the server, a list of library selections based on at least one of the pitch or the chord progression, wherein the list of library selections corresponds to a plurality of instruments that can play the second vocal content;
   receiving, by the server, a selection of one of the library selections from the second application;
   generating, by the server, an audio content based on the selection such that the audio content contains the second vocal content in instrumental form based on the selection, wherein replacing the one of the defined organizational elements with the second vocal content includes replacing the one of the defined organizational elements with the audio content.

51. The method of claim 1, wherein the server implements a web socket technique, wherein the second client is operated by a first user, and further comprising:
   granting, by the server, a write access to a second user operating a fourth client before the second acoustic fingerprint is formed, wherein the write access is for the second vocal content such that the second client and the fourth client can collaboratively real-time edit the second vocal content based on the web socket technique before the second acoustic fingerprint is formed.

52. The method of claim 1, further comprising:
   performing, by the server, a comparison between the first musical composition and the third musical composition before the second acoustic fingerprint is associated with the second block;
   determining, by the server, responsive to the comparison, whether the third musical composition is sufficiently original relative to the first musical composition based on a plurality of criteria, wherein the second acoustic fingerprint is associated with the second block of the blockchain based on the third musical composition being determined to be sufficiently original relative to the first musical composition.

53. The method of claim 52, wherein at least one of the criteria includes a cadence of at least one of the first musical composition or the third musical composition.

54. The method of claim 52, wherein at least one of the criteria includes a percentage of change of the first vocal content containing the second vocal content replacing the one of the defined organizational elements in the third musical composition relative to the first vocal content of the first musical composition.

\* \* \* \* \*